US011229028B2

(12) United States Patent
Vos et al.

(10) Patent No.: US 11,229,028 B2
(45) Date of Patent: Jan. 18, 2022

(54) METHOD AND SYSTEM FOR RADIO RESOURCE ALLOCATION

(71) Applicant: Sierra Wireless, Inc., Richmond (CA)

(72) Inventors: Gustav Gerald Vos, Surrey (CA); Ramon Khalona, Carlsbad, CA (US); Steven John Bennett, Coquitlam (CA)

(73) Assignee: SIERRA WIRELESS, INC., British Columbia (CA)

( * ) Notice: Subject to any disclaimer, the term of this patent is extended or adjusted under 35 U.S.C. 154(b) by 0 days.

(21) Appl. No.: 15/171,550

(22) Filed: Jun. 2, 2016

(65) Prior Publication Data

US 2016/0278098 A1    Sep. 22, 2016

Related U.S. Application Data

(63) Continuation of application No. 14/046,265, filed on Oct. 4, 2013, now abandoned.

(Continued)

(51) Int. Cl.
*H04W 72/04* (2009.01)
*H04W 28/06* (2009.01)
(Continued)

(52) U.S. Cl.
CPC ....... *H04W 72/0486* (2013.01); *H04W 28/06* (2013.01); *H04W 72/02* (2013.01);
(Continued)

(58) Field of Classification Search
None
See application file for complete search history.

(56) References Cited

U.S. PATENT DOCUMENTS

| 5,732,348 A | 3/1998 | Norimatsu |
| 6,188,911 B1 | 2/2001 | Wallentin et al. |

(Continued)

FOREIGN PATENT DOCUMENTS

| CA | 2 710 158 | 7/2009 |
| CN | 101300767 A | 11/2008 |

(Continued)

OTHER PUBLICATIONS

IPWireless Inc.: Sackwards compatible support for reduced bandwidth LTE UEs, 3GPP TSG RAN WG1 Meeting #68, R1-120799, Dresden, Germany, Feb. 6-10, 2012.

(Continued)

*Primary Examiner* — Andre Tacdiran
(74) *Attorney, Agent, or Firm* — Duane Morris LLP; Thomas J. Kowalski; Heidi E. Lunasin

(57) ABSTRACT

The present technology provides a computer-implemented method and system for performing frequency selective scheduling between a user equipment (UE) and a base station. The UE selects a sub-band within a predetermined system bandwidth based on observed radio conditions. The UE then communicates the selected sub-band to the base station. The base station then selects a LTE resource block having a frequency range falling within the sub-band. The selected resource block is then used for communication between the base station and the UE. The process may be repeated at a frequency related to the channel coherence.

18 Claims, 6 Drawing Sheets

Related U.S. Application Data

(60) Provisional application No. 61/710,411, filed on Oct. 5, 2012.

(51) Int. Cl.
*H04W 72/02* (2009.01)
*H04W 72/12* (2009.01)

(52) U.S. Cl.
CPC ... *H04W 72/1231* (2013.01); *H04W 72/1252* (2013.01); *H04W 72/12* (2013.01)

(56) References Cited

U.S. PATENT DOCUMENTS

| | | | |
|---|---|---|---|
| 8,345,588 B2 | 1/2013 | Adachi et al. | |
| 9,219,994 B2 | 12/2015 | Park et al. | |
| 2004/0258014 A1 | 12/2004 | Ro et al. | |
| 2005/0025039 A1* | 2/2005 | Hwang | H04L 5/023 370/206 |
| 2005/0286547 A1* | 12/2005 | Baum | H04L 5/023 370/437 |
| 2006/0215588 A1* | 9/2006 | Yoon | H04W 40/10 370/310 |
| 2007/0098098 A1* | 5/2007 | Xiao | H04L 5/0044 375/260 |
| 2007/0155323 A1* | 7/2007 | Matsumoto | H04L 5/0044 455/39 |
| 2007/0171864 A1 | 7/2007 | Zhang et al. | |
| 2008/0013599 A1 | 1/2008 | Malladi | |
| 2008/0086669 A1* | 4/2008 | Cheng | H04L 1/0073 714/748 |
| 2008/0170526 A1 | 7/2008 | Narang et al. | |
| 2008/0268785 A1 | 10/2008 | McCoy et al. | |
| 2009/0046647 A1* | 2/2009 | Roh | H04B 7/066 370/329 |
| 2009/0067531 A1 | 3/2009 | Lee et al. | |
| 2009/0175226 A1 | 7/2009 | Ren et al. | |
| 2009/0176490 A1 | 7/2009 | Kazmi | |
| 2009/0204863 A1* | 8/2009 | Kim | H04L 1/1861 714/748 |
| 2009/0221293 A1 | 9/2009 | Petrovic et al. | |
| 2009/0280823 A1* | 11/2009 | Petrovic | H04W 68/02 455/453 |
| 2010/0008310 A1 | 1/2010 | Gerstenberger et al. | |
| 2010/0008317 A1* | 1/2010 | Bhattad | H04L 1/0003 370/329 |
| 2010/0027492 A1 | 2/2010 | Asanuma | |
| 2010/0074130 A1 | 3/2010 | Bertrand | |
| 2010/0182975 A1 | 7/2010 | Malladi | |
| 2010/0302106 A1 | 12/2010 | Knudsen | |
| 2010/0329159 A1 | 12/2010 | Xia et al. | |
| 2011/0034198 A1* | 2/2011 | Chen | H04L 25/0202 455/509 |
| 2011/0164532 A1 | 7/2011 | Kawamura et al. | |
| 2011/0205982 A1 | 8/2011 | Yoo | |
| 2011/0222525 A1* | 9/2011 | Kishigami | H04L 5/0094 370/343 |
| 2011/0223958 A1 | 9/2011 | Chen | |
| 2011/0228883 A1 | 9/2011 | Liu et al. | |
| 2011/0235584 A1 | 9/2011 | Chen | |
| 2012/0002541 A1 | 1/2012 | Lee et al. | |
| 2012/0008590 A1 | 1/2012 | Novak et al. | |
| 2012/0020320 A1 | 1/2012 | Schmidt | |
| 2012/0033595 A1 | 2/2012 | Aoyama | |
| 2012/0082044 A1 | 4/2012 | Lysejko et al. | |
| 2012/0122467 A1 | 5/2012 | Auer et al. | |
| 2012/0163208 A1 | 6/2012 | Kamble et al. | |
| 2012/0163319 A1 | 6/2012 | Roessel | |
| 2012/0184316 A1* | 7/2012 | Ode | H04W 28/20 455/509 |
| 2012/0213110 A1* | 8/2012 | Yamaguchi | H04W 72/082 370/252 |
| 2012/0281569 A1 | 11/2012 | Yamamoto et al. | |
| 2013/0064129 A1 | 3/2013 | Koivisto et al. | |
| 2013/0077466 A1* | 3/2013 | Takaoka | H04W 72/0453 370/210 |
| 2013/0128834 A1 | 5/2013 | Higuchi | |
| 2013/0176852 A1 | 7/2013 | Lumezanu et al. | |
| 2013/0176952 A1 | 7/2013 | Shin et al. | |
| 2013/0188492 A1* | 7/2013 | Gorgen | H04L 1/1854 370/235 |
| 2013/0190027 A1 | 7/2013 | Cao | |
| 2013/0229972 A1 | 9/2013 | Lee | |
| 2013/0242771 A1 | 9/2013 | Ohta | |
| 2013/0242823 A1 | 9/2013 | Lin | |
| 2013/0272251 A1 | 10/2013 | Schmidt | |
| 2014/0098663 A1 | 4/2014 | Vos et al. | |
| 2014/0098781 A1 | 4/2014 | Vos et al. | |
| 2014/0153516 A1 | 6/2014 | Young et al. | |
| 2014/0198726 A1 | 7/2014 | Xu | |
| 2014/0307697 A1 | 10/2014 | Beale | |
| 2014/0334372 A1 | 11/2014 | Vos | |
| 2014/0369223 A1 | 12/2014 | Takeda | |
| 2015/0117352 A1* | 4/2015 | Nammi | H04L 5/0058 370/329 |
| 2015/0156776 A1* | 6/2015 | Chen | H04W 4/70 370/329 |
| 2015/0195069 A1* | 7/2015 | Yi | H04W 4/70 370/329 |
| 2015/0195094 A1 | 7/2015 | Yu | |
| 2015/0222407 A1* | 8/2015 | Nammi | H04B 7/0413 370/336 |
| 2016/0270051 A1* | 9/2016 | Wengerter | H04L 1/0026 |

FOREIGN PATENT DOCUMENTS

| | | |
|---|---|---|
| CN | 101517929 A | 8/2009 |
| CN | 101567714 A | 10/2009 |
| CN | 101785220 A | 7/2010 |
| CN | 102047732 A | 5/2011 |
| CN | 103533657 B * | 7/2012 |
| EP | 2 259 452 | 12/2010 |
| EP | 2485552 A1 | 8/2012 |
| WO | WO 2003/058907 | 7/2003 |
| WO | 2011/100479 A1 | 8/2011 |
| WO | WO 2013/027522 | 2/2013 |
| WO | WO 2014/055878 | 4/2014 |

OTHER PUBLICATIONS

Sierra Wireless: PUSCH coverage improvement through limiting the number of sub-carriers per resource block. 3GPP TSG RAN WGI #71: R1-125083, New Orleans USA, Nov. 12-16, 2012.

Sierra Wireless: Text proposal for MTC coverage improvement through limiting the number of sub-carriers per resource block. 3GPP TSG RAN WGI #72; R1-130064, Malta, Jan. 28-Feb. 1, 2013.

Hung H. Myung, Technical Overview of 3GPP LTE, Indian Institute of Technology, https://www.iith.ac.in/~tbr/teaching/docs/LTE-Tutorial.pdf.

Huawei, Coverage anlysis on (E)PDCCH and PUCCH for low-cost MTC UEs, 3GPP TSG RAN WG1 Meeting #72b R1-130689, Chicago, USA, Apr. 15-19, 2013.

Huawei, Coverage enhancement for physical channels and signals for low-cost MTC, 3GPP TSG RAN WG1 Meeting #72, R1-130017, St. Julian's, Malta, Jan. 28-Feb. 1, 2013.

Samsung, (E)PDCCH coverage enhancements for low-cost MTC UEs, 3GPP TSG RAN WG1 Meeting #72bis, R1-131017, Chicago, USA, Apr. 15-Apr. 19, 2013.

Sierra Wireless: Restrictive Scheduling for SIBs for MTC coverage improvement. 3GPP TSG RAN WGI #73. R1-131867, Fukuoka, Japan May 30-24, 2013.

ZTE, SIB coverage improvement, 3GPP TSG RAN WGI Meeting #73, R1-135358, San Francisco, USA, Nov. 11-15, 2013.

Office Action issued in U.S. Appl. No. 14/262,433, filed Nov. 17, 2017.

Office Acton issued in U.S. Appl. No. 14/262,433 dated Feb. 2, 2016.

(56) References Cited

OTHER PUBLICATIONS

Notice of Allowance issued in U.S. Appl. No. 14/262,433 dated Feb. 9, 2018.
Response dated Nov. 6, 2017 in U.S. Appl. No. 14/282,433.
EP Examination Report issued in EP Application No. 14794497.9 dated Mar. 15, 2018.
Extended EP Search Report issued in EP Application No. 14794497.9 dated Nov. 16, 2016.
Office Action issued in U.S. Appl. No. 14/046,475 dated Mar. 30, 2018.
Office Acton issued in U.S. Appl. No. 14/046,475 dated Jul. 28, 2017.
Office Action issued in U.S. Appl. No. 14/046,475 dated Jan. 3, 2017.
Office Acton issued in U.S. Appl. No. 14/046,475 dated Apr. 22, 2016.
Office Action issued in U.S. Appl. No. 14/046,475 dated Jul. 2, 2015.
Extended EP Search Report issued in EP Application No. 13843701.7 dated Apr. 1, 2016.
Extended EP Search Report issued in EP Application No. 13643386.7 dated Apr. 11, 2016.
Office Action dated Dec. 5, 2018 issued in corresponding CN Application No. 201380063461.7.
Office Action dated Aug. 3, 2018 issued in corresponding CN Patent Application No. 201380063488.6.
Office Action dated Jun. 18, 2018 issued in corresponding EP Patent Application No. 13843701.7.
Office Action dated Nov. 8, 2018 issued in corresponding U.S. Appl. No. 14/046,475.
Communication under Rule 71(3) Intention to Grant dated Apr. 5, 2019 issued in EP Application No. 13843701.7.
Agenda Item 6.1.2, UL Sounding RS Operation, LG Electronics, Shenzhen, China, Mar. 31 to Apr. 4, 2008, 3GPP TSG Ran WG1 #52 bis, RI-081249.
Notice of Allowance issued in U.S. Appl. No. 14/046,475 dated Jun. 12, 2019.
Decision of Rejection dated Feb. 26, 2019, for corresponding Chinese Patent Application No. 201380063488.6, 18 pages (with English translation).
Intention of Grant dated Nov. 21, 2018, for corresponding EP Application No. 13843386.7, 5 pages.

Office Action dated Sep. 7, 2018, for corresponding U.S. Appl. No. 15/171,550, 28 pages.
3rd Generation Partnership Project; Technical Specification Group Radio Access Network; Study on provision of low-cost MTC UEs based on LTE; (Release 11) 3GPP TR 36.888, 3rd Generation Partnership Project, (Jun. 2012), www.3gpp.org.
3rd Generation Partnership Project; Technical Specification Group Services and System Aspects; Study on Facilitating Machine to Machine Communication in 3GPP Systems; (Release 8), 3rd Generation Partnership Project, 3GPP TR22.868 V8.0.0, (Mar. 2007).
LTE TDD Technology Overview by Maria Djanatliev http://www.slideshare.net/GoingLTE/lte-tdd-technology-overview.
3GPP document: TD 36.211; Evolved Universal Terrestrial Radio Access (E-UTRA); Physical channels and modulation; Release 11(Oct. 2012).
LTE—The UMTS Term Evolution: From Theory to Practice, 2nd Edition, Stefania Sesia et al.; (Aug. 2011), pp. 194-195.
International Search Report and Written Opinion dated Dec. 27, 2013, for related International Application No. PCT/CA2013/050752.
International Search Report and Written Opinion dated Dec. 5, 2013, for related International Application No. PCT/CA2013/050750.
Beale, M., Future Challenges in efficiency supporting M2M in the LTE standards; 2012 IEEE Wireless Communications and Networking Conference Workshop, Apr. 2012.
3GPP TS 36.331, Version 11.3.0, "3rd Generation Partnership Project; Technical Specification Group Radio Access Network; Evolved Universal Terrestrial Radio Access (E-UTRA); Radio Resource Control (RRC); Protocol specification (Release 11)," (Apr. 2013).
3GPP TS 36.306, "Technical Specification; 3rd Generation Partnership Project; Technical Specification Group Radio Access Network; Evolved Universal Terrestrial Radio Access; (E-UTRA); User Equipment (UE) radio access capabilities," Release 11, V.11.3.0, (Apr. 2013).
http://lteinwireless.blogspot.ca/2011/06/all-about-sibs-in-lte.html.
International Search Report and Written Opinion dated Jul. 16, 2014, for related International Application No. PCT/CA2013/050397.
Telesystem Innovations, Inc. "LTE in a Nutshell: The Physical Layer" White Paper, 2010.

\* cited by examiner

METHOD AND SYSTEM FOR RADIO RESOURCE ALLOCATION

CROSS-REFERENCE TO RELATED APPLICATION

This application claims priority to U.S. patent application Ser. No. 14/046,265, filed Oct. 4, 2013, which claims priority to provisional patent application Ser. No. 61/710,411, filed Oct. 5, 2012, entitled "METHOD AND SYSTEM FOR RADIO RESOURCE ALLOCATION."

FIELD OF THE TECHNOLOGY

The present technology pertains in general to radio communication; and in particular to allocation of radio frequencies for use in communicating with Machine-to-Machine (M2M) devices via a communication standard such as the Long-Term Evolution (LTE) standard.

BACKGROUND

The latest generation cellular radio standard known as LTE (Long Term Evolution) has been designed to provide high data rate capacity and good spectral efficiency in terms of bits per second per Hz. This serves the needs of smartphones, tablet and laptop computers that offer high data capacity using applications such as video streaming. M2M (Machine to Machine) applications of cellular radio in many cases require only a modest amount of data capacity. In many cases communication is short and intermittent and the "mobile" M2M device may not move, or may have limited mobility and low speed. This is a significantly different use case from the uses that drove the LTE specification and which currently drive the chip designs for LTE.

M2M is set for very significant growth in the next few years. The total number of M2M connected devices may exceed the current numbers of phones, smartphones and other data communication devices. It is currently popular in the M2M modems market to use the older GSM/GPRS networks that have lower data rates, relative simplicity and lower cost. Unfortunately, this cannot be a long term solution as smartphones are migrating to the new 3G and LTE technologies. It is expected that the service providers will not want to maintain the older base stations. Also, with an ongoing shortage of available bandwidth for new services the service providers may want to migrate their spectrum allocations from GSM/GPRS to the newer systems that have higher capacity in a given bandwidth. This means that eventually GSM/GPRS may no longer be supported.

The 3GPP (Third Generation Partnership Project) standards committees have recognized the need for LTE to support very large numbers of M2M UEs (User Equipment) and have identified objectives for modifications to the existing LTE standards designed to support very large numbers of M2M UEs. A particular requirement of proposed changes to the existing standards is to ensure ongoing compatibility with existing devices and to limit the impact of M2M traffic on the high data rate and low latency requirements of current and future users.

The standards groups have identified specific features and requirements for facilitating coexistence of large number of M2M UEs with each other and with other classes of UEs on the LTE system. There is also an objective to make it possible to have simpler and lower cost modems for M2M UEs that may not take advantage of advanced LTE features. For example LTE offers MIMO for higher capacity and more reliable communication. M2M UEs may be cost reduced by not using this feature, which requires multiple radios operating simultaneously.

Some ideas on the subject of M2M specialization within the LTE standard are captured in the draft specification entitled "3rd Generation Partnership Project; Technical Specification Group Radio Access Network; Study on provision of low-cost MTC UEs based on LTE; (Release 11) 3GPP TR 36.888," $3^{rd}$ Generation Partnership Project, www.3gpp.org, referred to herein as TR 36.888.

One strategy is to reduce the bandwidth of communication in the downlink (base station to UE) from 20 MHz down to as little as 1.4 MHz. This serves to reduce the cost of the components needed in the UE receiver and may be used to improve signal to noise and interference ratio of the received signal due to the narrower required bandwidth. TR 36.888 describes using a dedicated 1.4 MHz block of frequencies in the current 20 MHz band, possibly in the center of the 20 MHz. This is enabled in part because LTE uses OFDM/OFDMA that allocates many narrow band carriers to the band. Having all M2M UEs share only a part of the band is not an ideal solution because the small band would quickly become congested.

A potential improvement in the use of the available spectrum is to have the M2M UEs dynamically assigned 1.4 MHz wide bands for data and control, as also briefly mentioned in TR 36.888. A potential disadvantage is that this approach requires additional scheduling and messaging overhead.

In a process known as Frequency Selective Scheduling (FSS), each UE transmits channel quality information (CQI) to its base station, Evolved Node B (eNB). The eNB then selects resource blocks for each UE based on the reported CQI. The selected resource blocks may be used for downlink communication, for example. In some cases, an approximately 10% loss in performance results if FSS is not used (see TR 36.888).

The existing methods of CQI reporting specified in the LTE standard allow a UE to report a combination of a modulation and an error correction coding rate that gives a better than or equal to 10% Block Error Rate (BLER). In general, a wideband measurement is made for CQI, but there is provision for various smaller bands to be measured. If the eNB controls the configuration of the CQI feedback, then the smallest bandwidth that can be reported is in proportion to the overall bandwidth of the system. Reporting of the sub-band CQI is relative to the overall wideband CQI. As an option the UE can also select bands according to similar but not identical constraints.

Therefore there is a need for a method and system for radio resource allocation that is not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide a method and system for radio resource allocation, for example within an LTE or similar communication system. In accordance with an aspect of the present technology, there is provided a computer-implemented method for performing frequency selective scheduling between a user equipment (UE) and a base station, the method comprising: selecting, by the UE, a sub-band within a predetermined system bandwidth based on observed radio conditions; communicating the selected sub-band from the UE to the base station; selecting, by the base station, a LTE resource block having a frequency range falling within the sub-band; and using the selected resource block for communication between the base station and the UE.

In accordance with another aspect of the present technology, there is provided a system comprising a user equipment (UE) and a base station, the system configured for performing frequency selective scheduling between the UE and the base station and comprising: a sub-band selection module of the UE, the sub-band selection module configured to select a sub-band within a predetermined system bandwidth based on observed radio conditions; communication means for communicating the selected sub-band from the UE to the base station; and a resource block selection module of the base station, the resource block selection module configured to select a LTE resource block having a frequency range falling within the sub-band; wherein the system is further configured to use the selected resource block for communication between the base station and the UE.

In accordance with another aspect of the present technology, there is provided a computer program product comprising a memory having computer readable code embodied therein, for execution by a CPU, for performing operations for performing frequency selective scheduling between a user equipment (UE) and a base station, the operations comprising: selecting, by the UE, a sub-band within a predetermined system bandwidth based on observed radio conditions; communicating the selected sub-band from the UE to the base station; selecting, by the base station, a LTE resource block having a frequency range falling within the sub-band; and using the selected resource block for communication between the base station and the UE.

BRIEF DESCRIPTION OF THE FIGURES

These and other features of the technology will become more apparent in the following detailed description in which reference is made to the appended drawings.

DETAILED DESCRIPTION OF THE TECHNOLOGY

Figure 1A:
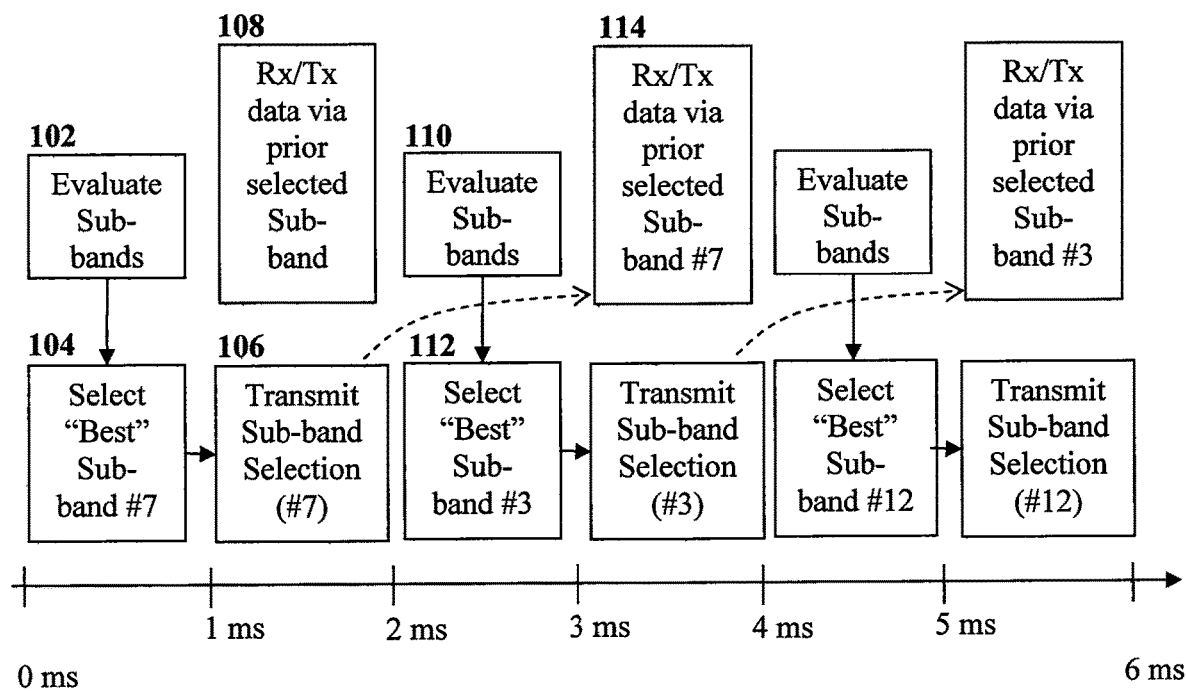
FIGS. 1A and 1B illustrate example frequency selective scheduling operations in accordance with embodiments of the technology.

As used herein, a machine-to-machine (M2M) terminal or user equipment refers to a wireless communication terminal linked to an automated device, such as a smart meter, environmental monitor, medical patient monitor, traffic monitoring and/or control device, or other automated equipment. M2M terminals are typically distinguished from human-to-human terminals, and are typically subjected to different communication demands. For example, M2M terminals may be more delay tolerant, and may potentially transmit and receive less data overall than other devices. An M2M terminal may also be known as a machine-type-communication (MTC) terminal. An example study on M2M communications is presented in "3rd Generation Partnership Project; Technical Specification Group Services and System Aspects; Study on Facilitating Machine to Machine Communication in 3GPP Systems; (Release 8)," $3^{rd}$ Generation Partnership Project, 3GPP TR 22.868 V8.0.0, March, 2007.

As used herein, the term "about" refers to a +/−10% variation from the nominal value. It is to be understood that such a variation is always included in a given value provided herein, whether or not it is specifically referred to.

The current LTE standard specifies at least the following terms. A slot corresponds to a 0.5 ms time interval. A sub-frame corresponds to a 1 ms time interval of two consecutive slots. A half frame corresponds to 5 sub-frames and a frame corresponds to 10 sub-frames. A transmit time interval (TTI) also corresponds to a 1 ms time interval. In some embodiments, scheduling decisions may be modified every 1 TTI. A resource block corresponds to 12 subcarriers times 1 slot. Each subcarrier is spaced apart by 15 kHz. A resource block thus spans 180 kHz and 0.5 ms. The LTE system bandwidth is adjustable between about 1.4 MHz and 20 MHz. Embodiments of the present technology are compatible with the above terms and values. However, it is recognized that the present technology may also be applicable if the terminology and values are adjusted, for example due to further revisions of the LTE standard. It is also recognized that the present technology may be applicable to other substantially similar standards, whether derived from the LTE standard or developed independently.

Unless defined otherwise, all technical and scientific terms used herein have the same meaning as commonly understood by one of ordinary skill in the art to which this technology belongs.

Embodiments of the present technology provide a computer-implemented method for performing frequency selective scheduling between a user equipment (UE) and a base station. The method comprises selecting, by the UE, a sub-band within a predetermined system bandwidth based on observed radio conditions. The method further comprises communicating the selected sub-band from the UE to the base station. The method further comprises selecting, by the base station, a LTE resource block having a frequency range falling within the sub-band. The method further comprises using the selected resource block for communication between the base station and the UE. In various embodiments, communication between the base station and the UE corresponds to downlink communication from the base station to the UE, thus the base station transmits using the selected resource block and the UE monitors and/or buffers the selected resource block in order to receive the base station's transmission.

As used herein, a sub-band corresponds to a range of frequencies falling within the system bandwidth, such as a 20 MHz channel or a smaller bandwidth channel corresponding to a particular LTE implementation. For existing LTE systems, the minimum sub-band bandwidth is 180 kHz. The existing LTE standard supports systems with standard bandwidths ranging between 1.4 MHz and 20 MHz.

Embodiments of the present technology provide a system comprising a user equipment (UE), such as a M2M UE, and a base station. The system is configured for performing frequency selective scheduling between the UE and the base station. The system comprises a sub-band selection module of the UE, which is configured to select a sub-band within a predetermined system bandwidth based on observed radio conditions. The system further comprises communication means for communicating the selected sub-band from the UE to the base station. The system further comprises a resource block selection module of the base station, the resource block selection module configured to select a LTE resource block having a frequency range falling within the sub-band. The system is further configured to use the selected resource block for communication between the base station and the UE.

In accordance with embodiments of the present technology, each user equipment (UE)(for example M2M UE) selects a 1.4 MHz-wide sub-band from within a predetermined system bandwidth of up to 20 MHz. A bandwidth of 1.4 MHz may be advantageous for M2M use, in terms of facilitating the introduction of a potentially large number of M2M UEs, backward compatibility with the LTE standard, and/or adequately addressing the typically lower bandwidth requirements of M2M UEs. In other embodiments, a sub-band having a different bandwidth may be selected. The UE may select the sub-band which it estimates or determines to be the best (e.g. highest signal strength) sub-band, for example. The UE may monitor sub-band parameters such as signal strengths in order to make such a determination. For example the UE may monitor Reference Signals occupying known symbol locations within the time and frequency grid of the eNB transmissions. Such Reference Symbols may be existing Reference Symbols occupying portions of resource blocks as defined in the existing LTE standard.

The UE may then communicate its channel selection to the eNB (Base Station) via a message embedded within a Channel Quality Indicator (CQI) message which is transmitted regularly from the UE to the eNB in accordance with the existing LTE standard. Existing CQI messages may be modified for this purpose. Alternatively, the UE may communicate its channel selection via another means, such as a dedicated message or embedding in another message. The M2M UE then listens for a resource assignment message on that sub-band in a subsequent transmit time interval, for example a time interval of 1 ms duration. The resource assignment message is generated by the eNB and transmitted to the M2M UE. The resource assignment message may be transmitted via resources that are at least partially predictable to the M2M UE. For example, the resource assignment message may be transmitted via resources falling within a range of resources which the UE monitors and/or buffers in anticipation of message receipt. The resource assignment message may indicate a 180 kHz resource block within the previously communicated 1.4 MHz sub-band, which is to be used for communication to and/or from the M2M UE. Resource blocks are defined as in the LTE standard. In various embodiments, application to the uplink is applicable for Time Division Duplex (TDD) implementations.

In some embodiments, a delay of a discrete number of TTIs may be present between the UE transmitting its channel selection and the base station transmitting to the UE via a resource block having a frequency falling within the selected channel. This may be the case, for example, if processing resources at the base station are insufficient for responding within a single TTI. The base station will first send the UE Downlink Control Information (DCI) over the PDCCH assignment. The DCI will indicate where the resource block will be sent.

In some embodiments, the base station (eNB) may instruct a UE to report the sub-channel and CQI more or less frequently as for example once every 10 ms (10 TTIs) or asynchronously. In the asynchronous case, the eNB may then continue to use the communicated sub-band to communicate with the UE until the UE changes its selected sub-band.

In some embodiments, the base station (eNB) actively blacklists one or more sub-bands from use. In this scenario, the eNB may be configured to identify these one or more blacklisted sub-bands to the UEs, thereby potentially reducing the amount of searching and evaluation that the UEs would need to perform during sub-band selection. UEs would avoid considering the blacklisted sub-bands and may avoid evaluating channel quality of same. As such, having one or more blacklisted sub-bands may assist in the simplifying of scheduling performed by the eNB.

Existing LTE systems support both periodic CQI reporting using PUCCH and potentially a periodic CQI reporting using PUSCH. Some M2M devices may utilize aperiodic CQI reporting, for example with channel selection messages embedded therein. This may be particularly advantageous in terms of efficiency when the channel is not changing frequently. Another advantage of a periodic reporting on PUSCH is that it supports both types of sub-band CQI reporting (eNB configured or UE selected), whereas periodic reporting on PUCCH only supports UE-selected sub-band CQI reporting.

Existing LTE systems may provide adequate resolution for one or more 1.4 MHz or narrower bands to be selected for all system bandwidths. Embodiments of the present technology comprise modification of the existing LTE system to report only on the 1.4 MHz band that the UE is configured to listen to. The UE may report in the current differential CQI format relative to a wideband measurement. In various embodiments, such reporting is optional. This may require a new indicating format that the eNB will interpret correctly without conflict with the existing formats.

In various embodiments, the M2M UE is configured to only receive signals in a particular 1.4 MHz band. Correspondingly, the eNB may be configured to use a 1.4 MHz band indicated by the UE when responding to the UE in order to be sure of the UE being able to receive this response.

In various embodiments, all terminals operating in a LTE system are required to monitor the broadcast Master Information Block (MIB) transmitted in the center 6 resource blocks of the system. The MIB is in this location whether the total bandwidth occupied by the system is 1.4 MHz or any other bandwidth up to 20 MHz. This means that the UE receiver initially and then periodically monitors the center of the band even if it otherwise indicates that it would be listening for signals addressed to it on other frequencies. Additional information that all UEs are required to receive is transmitted in the System Information Block (SIB). This broadcast information is sent as part of the Physical Downlink Shared CHannel (PDSCH). In order to reliably communicate this information it may either be sent in a fixed known place for the benefit of narrow band M2M UEs or it may be sent in a designated place and the UEs informed of this. Alternatively, in embodiments of the present technology, the eNB may be configured to send the SIB to a UE in a band that the UE has indicated that it will listen to, for example in accordance with a procedure as set forth herein.

Figure 1B:
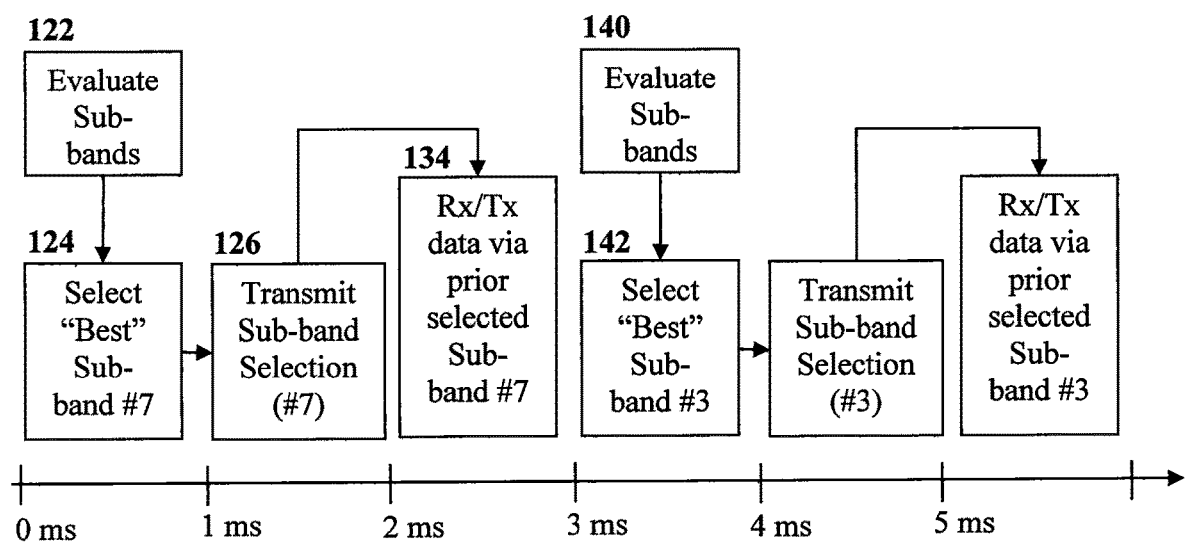

FIGS. 1A and 1B illustrate two examples of the present technology. The examples use 1 ms as the standard Transmit Time interval (TTI) in the LTE system. In the first example, illustrated in FIG. 1A, the UE first scans and evaluates 102 a plurality of sub-bands, and determines 104 that the "best" sub-band is the one having label number 7. This occurs during the first TTI (falling between 0 ms and 1 ms). During the second TTI (falling between 1 ms and 2 ms), the UE transmits 106 a CQI type message to the base station including an indicator that sub-band number 7 is selected (or preferred) for subsequent communication. The UE may also receive 108 data from the base station using a previously assigned band. The UE may also transmit to the base station assuming a UL resource assignment was given (not shown in the figure). During the third TTI (falling between 2 ms and 3 ms), the UE performs a new scan and evaluation 110 of a plurality of sub-bands, this time determining 112 that the "best" sub-band is number 3. In the fourth TTI the previously selected sub-band number 7 is used 114 for data transmission from the base station to the UE. The UE may suspend transmission operations when scanning, for example in order to avoid contaminating the scan with its own RF emissions. The process then continues in a repetitive manner, with odd-numbered TTIs (numbered subjectively as shown) used for sub-band scanning and selection, and even-numbered TTIs used for communication and communicating the most recent sub-band selection. Half of the available TTIs are thus used for communication and hence communication is performed at half speed.

In the second example, illustrated in FIG. 1B, the UE again first scans and evaluates 122 a plurality of sub-bands, and determines 124 that the "best" sub-band is the one having label number 7. This occurs during the first TTI (falling between 0 ms and 1 ms). During the second TTI (falling between 1 ms and 2 ms), the UE transmits a CQI message to the base station including an indicator 126 that sub-band number 7 is selected for subsequent communication. However, in this example the UE waits until the third TTI (falling between 2 ms and 3 ms) before receiving 134 data from the base station, but in this case the base station is able to register and use the selected sub-band number 7. The UE may also transmit to the base station. During the fourth TTI (falling between 3 ms and 4 ms), the UE performs a new scan and evaluation 140 of a plurality of sub-bands, this time determining 142 that the "best" sub-band is number 3. The process then continues, with TTIs numbered 1+3k (k=0, 1, 2, . . . ) used for sub-band scanning and selection, TTIs numbered 2+3k (k=0, 1, 2, . . . ) used for communicating the most recent sub-band selection, and TTIs numbered 3+3k (k=0, 1, 2, . . . ) used for communication. One third of the available TTIs are thus used for communication and hence communication is performed at one third speed. However, selected sub-bands are utilized sooner than in the first example.

In some embodiments, each 1.4 MHz sub-band is made up of 180 kHz resource blocks. Substantially any 1.4 MHz may be selected and reported as best by a UE on a 180 kHz scale of frequency steps corresponding to resource block allocations. The sub-band choices may therefore overlap. For example, if a first sub-band starts at frequency f and ends at frequency f+1.4 MHz, a second, overlapping sub-band may start at frequency f+df and end at f+df+1.4 MHz, where df is about 180 kHz, for example. The eNB may select a 180 kHz wide resource block within the UE-selected 1.4 MHz-wide sub-band, that will be tagged for the UE to receive. UEs may be configured to check each resource block within their selected 1.4 MHz wide sub-band to see if a message has been returned. If multiple UEs select the same or overlapping 1.4 MHz sub-band blocks the eNB may still send them each individual replies within available 180 kHz resource blocks.

It is to be expected that, due to frequency selective propagation and fading unique to each M2M UE, some 1.4 MHz sub-bands will be received better than others. In a typical situation one or more of the sub-bands are expected to be subject to multipath cancellation resulting in a poor signal. Typically, each UE will be subjected to different frequency selective propagation and fading conditions, and hence will have different sub-band quality profiles. In accordance with embodiments of the present technology, each UE therefore evaluates its own sub-band qualities and selects a desirable sub-band for use. This process may be repeated as required. In some cases this process may be repeated every few TTIs in order that sub-band selection is current to the changing radio environment. In some cases the process may be repeated less often, or on an as-needed basis, or in accordance with a hybrid of periodic scheduling and as-needed triggering.

In some embodiments, the frequency at which sub-bands are selected is variable and controlled in order to trade off overhead associated with the selection process with performance improvements associated with the selection process. The selection frequency may be communicated by the UE to the base station for example in a CQI or other message, or the selection frequency may be assigned by the base station to the UE, or the like. In various embodiments, the selection frequency is constrained based on an estimate of the channel coherence time. For example sub-band selections may be updated more frequently than channel conditions are expected to change, or at least on the same frequency order.

By allowing each UE to select its own sub-band, resource allocation decisions are partially allocated to the individual UEs. Since the UEs have the information necessary to perform the sub-band selection decisions, they may reliably do so while alleviating this processing burden from the base station. The base station reserves the ability to allocate resource blocks within the sub-band selection constraints provided by the UEs. Thus, a distributed resource allocation algorithm is implemented, with the further benefit that UEs (such as M2M UEs) having lower bandwidth requirements are allocated only a limited portion of the full LTE system bandwidth.

In accordance with some embodiments of the technology, an M2M UE is configured to sequentially sample transmissions from the base station for short intervals on all sub-bands within the predetermined system bandwidth, for example of 20 MHz width. A search method may comprise starting at one end of the band and sweeping across to the other end, evaluating sub-bands along the sweep. Other abbreviated search methods may also be used, such as sampling only a few bands or sampling less frequently. There are also other possible patterns of search, such as a random search. Each sub-band is evaluated for quality, for example by comparing the base station signal strengths for each sub-band. The highest signal strength sub-band may be equated with the highest-quality, most desirable sub-band. Evaluation of signal strength, signal-to-noise ratios, signal-to-interference-plus-noise ratios, and the like, may be performed in various ways as would be readily understood by a worker skilled in the art. For example the existing Reference Signals may be used for measurement.

In some embodiments, some, all, or substantially all potential sub-bands may be evaluated by a UE, and a desired sub-band selected, during a single TTI, for example of 1 ms duration. The selected sub-band may be communicated to the eNB during a subsequent TTI, for example the next TTI. A resource block within the selected sub-band may be used by the eNB for communication with the UE during a further subsequent TTI, for example the next TTI after communication of the selection to the eNB or the next TTI after that.

Figure 2:
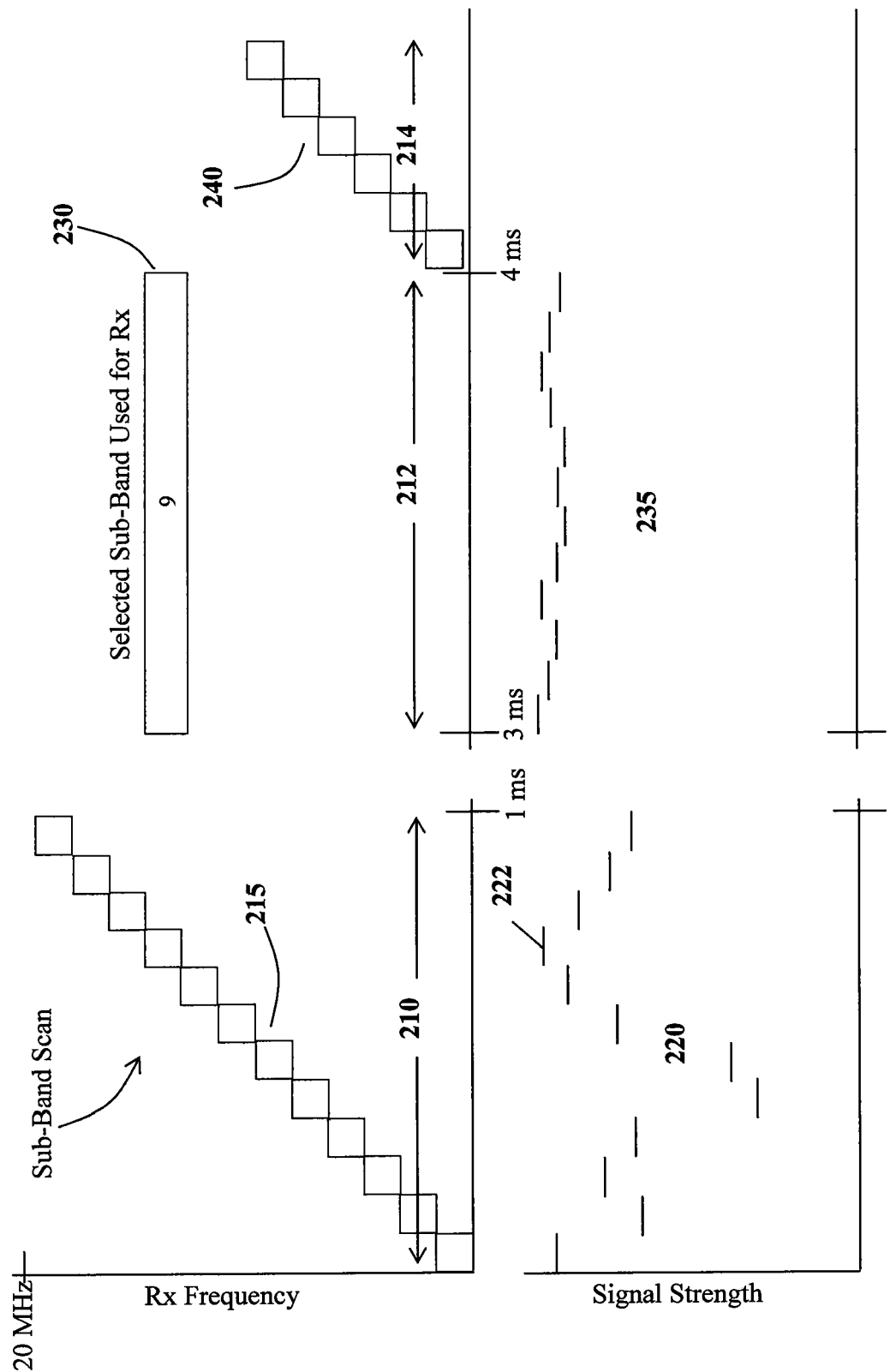
FIG. 2 illustrates example sub-band scanning and selection operations in accordance with embodiments of the technology.

FIG. 2 shows an approach for searching for the "best" sub-band using base station signal strength measurements, in accordance with an embodiment of the present technology. This embodiment is compatible with the timing of example 1 in FIG. 1A above. During the first TTI 210 (falling between 0 ms and 1 ms), the UE scans a plurality (12 illustrated) of sub-bands 215 falling within a 20 MHz frequency band corresponding to a predetermined LTE downlink channel. In practice the position of reference signals may only allow 4 of the 12 sub-bands to be evaluated in just one TTI. The base station signal strength is recorded 220 for each sub-band as shown in the figure. As illustrated, the sub-band with the highest signal strength 222 is number 9. This sub-band is communicated to the base station during the second TTI (not shown), and used for reception 230 during the fourth TTI 212. The scan then repeats 240 in the fifth TTI 214. FIG. 2 also illustrates that the signal strength 235 on sub-band 9 during the third TTI varies only slightly, meaning the channel coherence time is sufficiently long.

Figure 3:
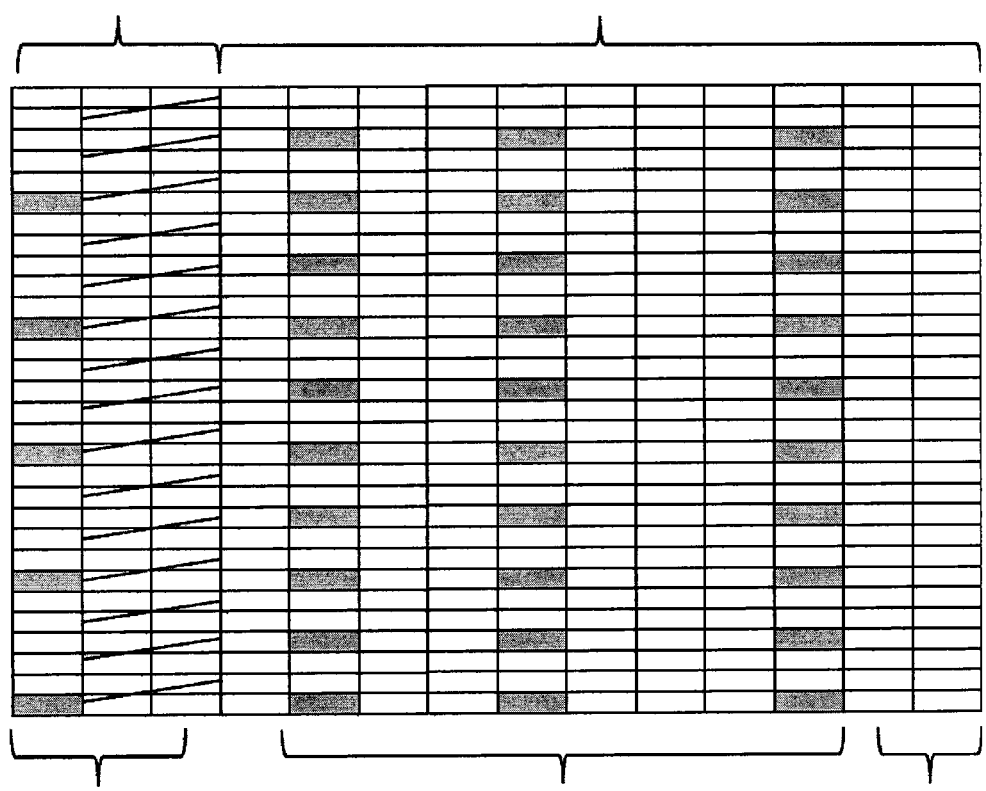
FIG. 3 illustrates a transmission sequence of the PDCCH and subsequent Reference Signals in accordance with embodiments of the present technology.

In some embodiments a UE may be configured to monitor and evaluate sub-bands after receiving the PDCCH data indicative that there is to be no following message addressed to that UE. As illustrated in FIG. 3, the UE may decode the PDCCH during a time interval 305 which occupies part of the beginning portion 310 of a 1 ms sub-frame 300. The PDCCH is communicated during the beginning portion 310. For example the PDCCH may be communicated via the first of 14 OFDM symbols in the sub-frame. If the PDCCH indicates that the OFDM symbols to follow 315 do not include a message for that UE, then sub-band evaluation can begin. There are three illustrated Reference Signals 320 after the PDCCH, and sub-band evaluation during time interval 325 may include evaluation of these reference signals. Following evaluation, the UE may switch back to decode the PDCCH again, with switching occurring during time interval 330. It may be necessary for the UE to have completed processing and decoding of the PDCCH in order to have made the determination of whether there is anything addressed to the UE. Potential locations of pilot symbols are shown as shaded areas in FIG. 3.

In some embodiments the UE may be configured to perform sub-band quality scanning during off periods of a Discontinuous Reception (DRX) cycle. As is known, LTE power save protocols include DRX and Discontinuous Transmission (DTX), wherein both involve reducing transceiver duty cycle while in active operation.

In embodiments, the validity of a determination of the "best" sub-band by the UE will last only for as long as it takes the propagation path to change (i.e. the coherence time of the channel). This is dependent principally on movement of the terminal but it is also affected by movement of objects in the propagation path. In the case of stationary M2M UEs the rate of change of propagation path characteristics is generally expected to be slow (for example on the order of 10 Hz in a typical radio environment). Thus, the UE may be configured to evaluate and select sub-bands at a frequency at least of the order of the rate of change of propagation path characteristics. The UE may further be configured to inform the eNB of how often it needs to do searches.

In some embodiments, evaluation of each sub-band may comprise a measurement of absolute signal strength, relative signal strength, or a combination thereof. The measured signal strengths may then be compared, with the highest absolute or relative signal strength corresponding to the most desirable sub-band. The most desirable sub-band, or a relatively desirable sub-band, may then be selected for use. Using relative signal strength may simplify operation. In practice the Reference Signals may be the only parts of the eNB transmission that have a constant power, therefore enabling relative measurement. Other parts of the transmission typically have variable power. If sufficient time is available to perform signal demodulation (i.e. on the pilot symbols), then more detailed channel evaluation measurements may be made. In some embodiments, UEs may be configured to choose to evaluate sub-bands and update their selection of sub-band based on need. For example if a particular sub-band consistently works then there may not be a need to evaluate and select a new sub-band. However, once messages appear to be consistently missed, evaluation of sub-bands and selection of a new sub-band may be triggered.

In embodiments of the present technology, the time interval at which sub-band evaluation and/or selection is performed by a UE may be variable, for example based on current traffic load. For example, since CQI reporting uses UL resources, the current LTE standard supports variable CQI reporting intervals. When there is not much data to send, the CQI reporting interval is increased thus reducing resource usage. This mechanism can be re-used with this technology with potentially few standards changes. The format of the CQI message may however require some nominal adjustment.

In some embodiments, during idle times or times of low data traffic volume, a UE may be configured to suspend sub-band selection based on observed radio conditions. At such times, the benefits of selecting a sub-band based on observed radio conditions are expected to be lower, while the resources expended to perform the selection are substantially unchanged. Thus, such a suspension of sub-band selection operations may avoid a waste of resources. Rather, the UE may be configured to randomly select a sub-band based on a PRS (Pseudo Random Sequence). Alternatively, the UE may be configured to use a sub-band which is assigned by the eNB.

In some embodiments, the UE is configured to observe radio conditions on at least one sub-band when the UE has determined that no communication with the base transceiver station (BTS) will occur.

In various embodiments, different groups of M2M UEs may be configured to measure for sub-band qualities at different times. Thus, some UEs may be receiving and/or transmitting signals sent to them at the same time that other UEs may be measuring for signal quality. Various mechanisms by which measurement activities of different UEs are spread over time may be implemented. For example, the times at which a UE is configured to measure for sub-band quality may be pre-assigned, for example by the eNB, or randomly determined, or determined based on an identifier of the UE, or the like.

In some embodiments, for FDD UEs implemented with a shared local oscillator for both transmit and receive functions, transmission may be disallowed or deferred when the receiver is performing sub-band monitoring operations.

Figure 4:
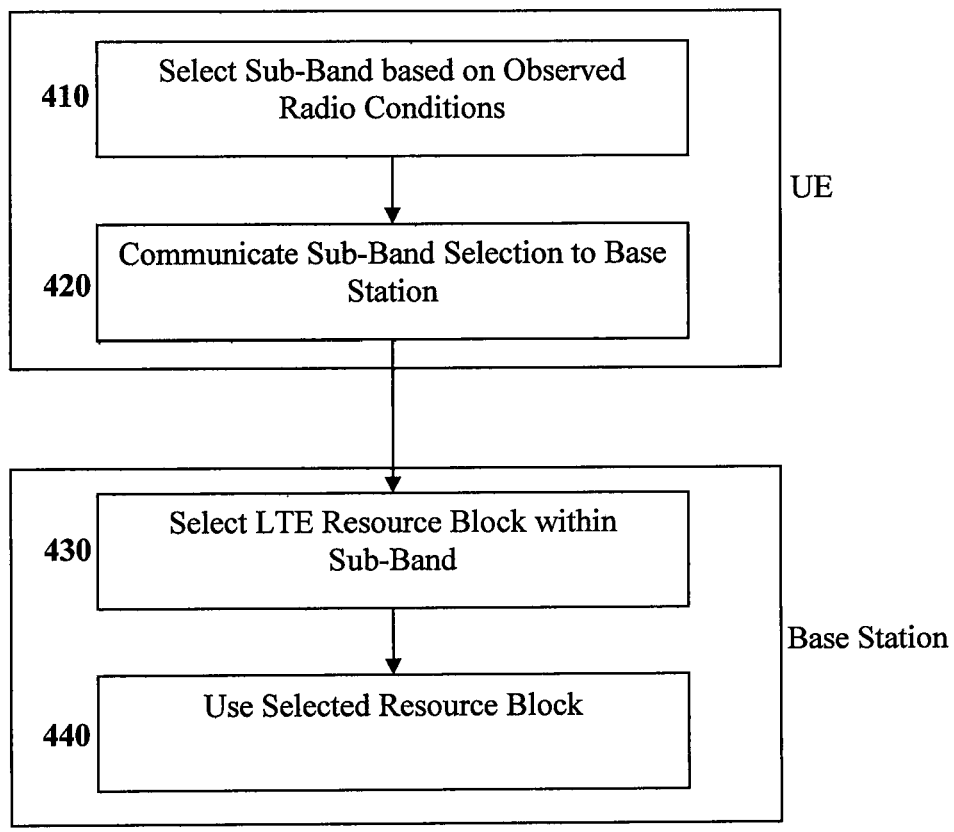
FIG. 4 illustrates a method for performing frequency selective scheduling between a user equipment (UE) and a base station, in accordance with embodiments of the present technology.

FIG. 4 illustrates a computer-implemented method for performing frequency selective scheduling between a user equipment (UE) and a base station, in accordance with embodiments of the present technology. The method comprises selecting, 410, by the UE, a sub-band within a predetermined LTE channel based on observed radio conditions. The method further comprises communicating 420 the selected sub-band from the UE to the base station. Communication may be embedded within an existing CQI message transmitted by the UE. The method further comprises selecting 430, by the base station, a LTE resource block having a frequency range falling within the sub-band. The method further comprises using 440 the selected resource block for communication between the base station and the UE.

Figure 5:
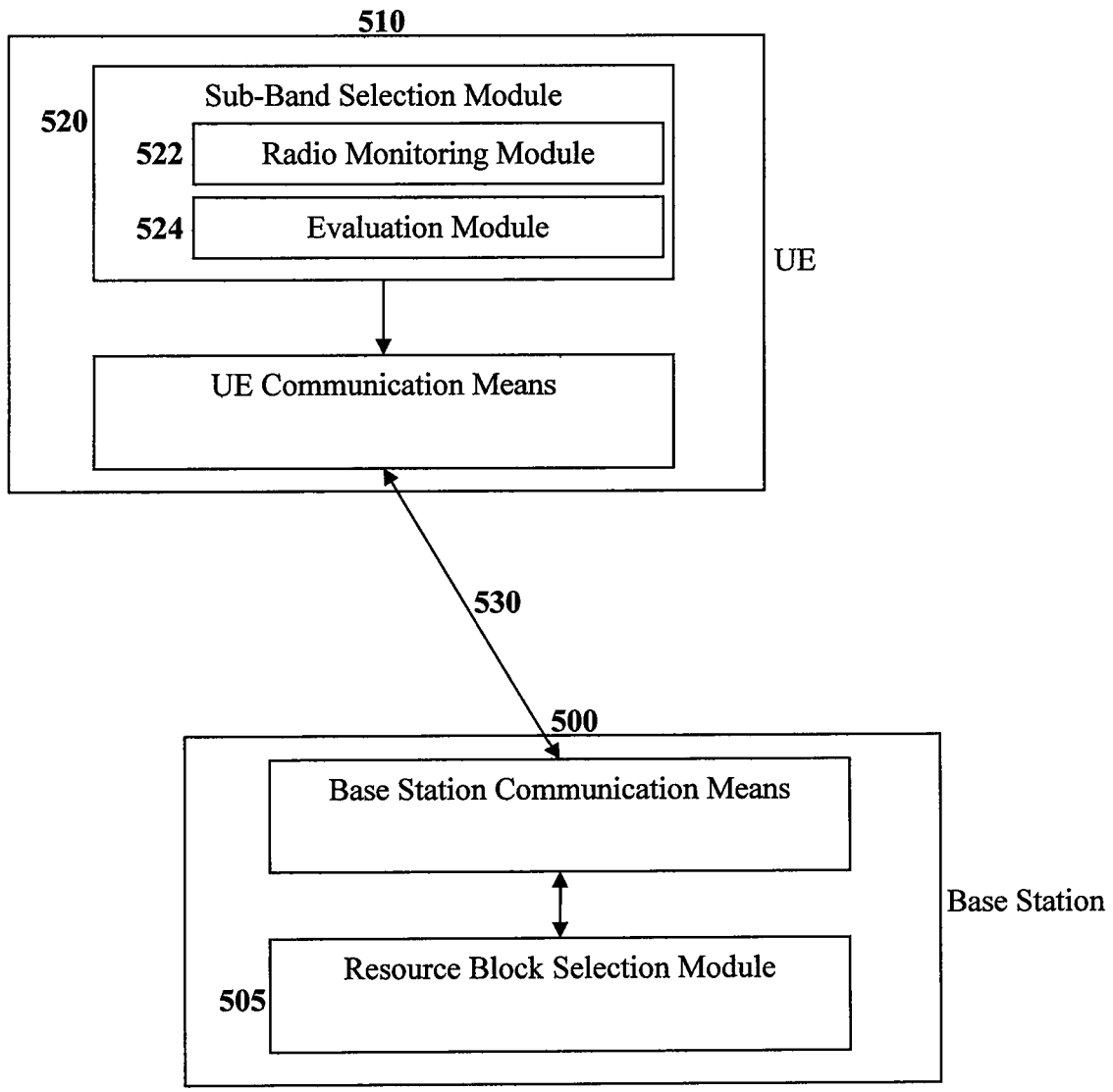
FIG. 5 illustrates a system for performing frequency selective scheduling between a user equipment (UE) and a base station, in accordance with embodiments of the present technology.

FIG. 5 illustrates a system comprising a user equipment (UE) 510 and a base station 500, in accordance with embodiments of the present technology. The system is configured for performing frequency selective scheduling between the UE and the base station. The system comprises a sub-band selection module 520 of the UE, the sub-band selection module configured to select a sub-band within a predetermined system bandwidth based on observed radio conditions. The sub-band selection module may comprise a radio monitoring module 522 and an evaluation module 524. The system further comprises communication means 530 for communicating the selected sub-band from the UE to the base station. The system further comprises a resource block selection module 505 of the base station, the resource block selection module configured to select a LTE resource block having a frequency range falling within the sub-band. The selected resource block is then indicated to the UE in the DCI via the PDCCH and used for communication with the UE 510. The resource block selection module 505 typically interoperates with plural UEs, each of the UEs operating similarly to the illustrated UE 510.

In an alternative embodiment, a UE may indicate more than one band that it finds to have acceptable signal quality. The UE may rank the bands in order, for example first, second and third choices. The UE may then be configured to monitor its first choice band for signal reception. The eNB may be configured to transmit using the first choice band where possible. If the eNB cannot schedule a transmission to the UE on that band it may send a control message indicating that it may be configured to send a message later on a specified one of the other band choices, to give the UE time to change its receive frequency to that band. In some embodiments, the UE may on a periodic or continuing basis determine averages of the signal quality of the preferred selected bands, for example the first, second and third selected bands, in order to periodically update the selection of the preferred bands.

The UE may comprise a computer processor operatively coupled to memory, along with other supporting electronics. The memory contains program instructions for executing operations to be carried out by the UE in accordance with the present technology. The functionality of the UE may be encoded in hardware, software, or firmware, or a combination thereof. The UE comprises radio communication electronics configured for monitoring the radio environment, and also for communicating to and from the base station, for example in the form of CQI messages and data messages. Various hardware components of an M2M UE may be provided as would be readily understood by a worker skilled in the art.

Embodiments of the present technology enable the operation of a LTE compatible narrow band M2M specialized transceiver, which is configured to provide the particular LTE communication capabilities as described herein. The chipset may be incorporated into user equipment such as M2M user equipment. The chipset may comprise baseband components, RF components, or both, as would be readily understood by a worker skilled in the art. In particular, the chipset may be configured to perform the sub-band selection, communication of the selection, and subsequent use of a particular resource block falling within the sub-band, as described herein.

The base station may comprise a computer processor operatively coupled to memory, along with other supporting electronics. The memory contains program instructions for executing operations to be carried out by the base station in accordance with the present technology. The functionality of the base station may be encoded in hardware, software, or firmware, or a combination thereof. The base station comprises radio communication electronics configured for communicating to and from the UE, for example in the form of CQI messages and data messages. Various hardware components of an LTE base station (eNB) may be provided as would be readily understood by a worker skilled in the art.

It will be readily understood that aspects of the technology as described herein may be provided in the form of an appropriate computer or computing system, such as a mobile terminal, UE, base station, eNB, or the like, or by a system of components in communication with each other via an LTE wireless communication network. Existing UEs and base stations may be modified in accordance with the present technology, for example by providing additional or replacement functionalities or functional modules alongside or in place of existing functionalities or functional modules. New functional modules may comprise appropriate hardware, software, firmware, or a combination thereof. For example, terminals, servers, network controllers, eNBs, and the like, may operate as described herein partially by causing a microprocessor or set of microprocessors to execute instructions stored in memory. The microprocessor in turn may cause other electronic components to operate as instructed, for example to process signals, transmit and receive radio signals, and the like. In some embodiments, hardware or firmware-enabled hardware, such as microcontrollers, digital signal processors, RF electronics components, or the like, or a combination thereof may be used and/or modified in a similar manner. In general, general-purpose or dedicated electronic components, as will be readily understood by a worker skilled in the art, will be used to implement the various functionalities as described herein. Various functionalities as described herein may be achieved via reconfiguration of existing hardware, software and/or firmware.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a solid or fluid transmission medium, magnetic or optical wire, tape or disc, or the like, for storing signals readable by a machine, for controlling the operation of a computer and/or firmware according to the method of the technology and/or to structure its components in accordance with the system of the technology.

In addition, while portions of the above discuss the technology as it can be implemented using a generic OS and/or generic hardware, it is within the scope of the present technology that the method, apparatus and computer program product of the technology can equally be implemented to operate using a non-generic OS and/or can use non-generic hardware.

Further, each step of the method may be executed on one or more appropriate computing devices, such as M2M devices, personal computers, servers, base stations, or the like, or system of computing devices, and pursuant to one or more, or a part of one or more, program elements, modules or objects generated from any programming language, such as C++, C #, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

The invention claimed is:

1. A computer-implemented method for performing frequency selective scheduling between a user equipment (UE) and a base station, the method comprising:
   scanning and evaluating, by the UE, radio conditions of a plurality of sub-bands within a predetermined system bandwidth;
   in response to the scanning and evaluating, suspending, by the UE, transmission;
   selecting, by the UE, a sub-band within the predetermined system bandwidth, wherein the sub-band is selected based on a ranking of radio conditions of the plurality of sub-bands within the predetermined system bandwidth;
   communicating the selected sub-band from the UE to the base station; and
   receiving, by the UE, a resource block from the base station,
   wherein the resource block is selected by the base station among a plurality of resource blocks within the selected sub-band communicated from the UE to the base station,
   wherein receipt of the resource block within the selected sub-band occurs one or more transmit time intervals after communicating the selected sub-band from the UE to the base station,
   wherein receipt of the resource block within the selected sub-band occurs one or more transmit time intervals after receiving, from the base station, a control message indicative of the selected sub-band carrying the resource block,
   wherein the resource block supports data communication between the base station and the UE.

2. The method of claim 1,
   wherein at least one transmit time interval separates communicating the selected sub-band and receiving the resource block.

3. The method of claim 1,
   wherein receiving the resource block and communicating the selected-sub-band occur in adjacent transmit time intervals.

4. The method of claim 1,
   wherein communicating the selected sub-band from the UE to the base station comprises communicating a Channel Quality Indicator (CQI) having the selected sub-band embedded therein.

5. The method of claim 1, further comprising transmitting a resource assignment message from the base station to the UE,
   wherein the resource assignment message
   is indicative of the resource block and
   transmitted using resources which the UE monitors in anticipation of receiving the resource assignment message.

6. The method of claim 5,
   wherein the resource assignment message is transmitted using the resource block.

7. The method of claim 6,
   wherein the UE is configured to monitor all resource block frequencies within the selected sub-band for the resource assignment message.

8. The method of claim 1,
   wherein the sub-band is selected from a plurality of overlapping sub-bands.

9. The method of claim 1,
   wherein the radio conditions include transmission signal quality of the base station on at least one sub-band, as observed by the UE.

10. The method of claim 1,
    wherein the selected sub-band has a bandwidth equal to a bandwidth of the UE.

11. The method of claim 1,
    wherein the scanning and evaluating the radio conditions of the plurality of sub-bands includes evaluating the plurality of sub-bands following at least one of:
    a sequential pattern,
    a sweeping pattern,
    a sub-sampled pattern or
    a random pattern.

12. A system for performing frequency selective scheduling, the system comprising:
    a user equipment (UE) configured to:
      scan and evaluate radio conditions of a plurality of overlapping sub-bands within a predetermined system bandwidth;
      in response to the scanning and evaluating, suspend, by the UE, transmission;
      select a sub-band within the predetermined system bandwidth, and
      transmit the selected sub-band from the UE to a base station,
    wherein the sub-band is selected based on radio conditions from the plurality of overlapping sub-bands within the predetermined system bandwidth; and
    the base station configured to receive the selected sub-band, select a resource block among a plurality of resource blocks within the selected sub-band transmitted from the UE to the base station, and transmit the resource block to the UE on the selected sub-band;
    wherein the base station is configured to perform transmission of the resource block within the selected sub-band one or more transmit time intervals after transmission of the selected sub-band from the UE to the base station;
    wherein the base station is configured to perform transmission of the resource block within the selected sub-band one or more transmit time intervals after transmitting, to the UE, a control message indicative of the selected sub-band carrying the resource block;
    wherein the system is configured to use the resource block for data communication between the base station and the UE.

13. The system of claim 12,
    wherein at least one transmit time interval separates transmission of the selected sub-band and transmission of the resource block.

14. The method of claim 12,
wherein transmission of the selected sub-band and transmission of the resource block is performed in adjacent transmit time intervals.

15. The system of claim 12,
wherein the UE is configured to communicate the selected sub-band to the base station by communicating a Channel Quality Indicator (CQI) having the selected sub-band embedded therein.

16. A computer-implemented method for performing frequency selective scheduling between a user equipment (UE) and a base station, the method comprising:
scanning and evaluating, by the UE, radio conditions of a plurality of sub-bands within a predetermined system bandwidth;
in response to the scanning and evaluating, suspending, by the UE, transmission;
selecting, by the UE, the plurality of sub-bands within a predetermined system bandwidth, wherein the plurality of sub-bands are ranked in terms of radio conditions of the plurality of sub-bands;
communicating the selected plurality of sub-bands from the UE to the base station; and
receiving, by the UE, a resource block from the base station,
wherein the resource block is selected by the base station among a plurality of resource blocks within a resource transmitting sub-band among the selected plurality of sub-bands communicated from the UE to the base station,
wherein receipt of the resource block within the resource transmitting sub-band occurs one or more transmit time intervals after communicating the selected plurality of sub-bands from the UE to the base station,
wherein receipt of the resource block within the resource transmitting sub-band occurs one or more transmit time intervals after receiving, from the base station, a control message indicative of the resource transmitting sub-band carrying the resource block,
wherein the resource block supports data communication between the base station and the UE.

17. The method of claim 16,
wherein the resource transmitting sub-band is ranked first among the selected plurality of sub-bands.

18. The method of claim 16,
wherein the resource transmitting sub-band is ranked lower than first among the selected plurality of sub-bands.

* * * * *